(12) United States Patent
Mohiuddin (10) Patent No.: US 7,894,537 B2
(45) Date of Patent: Feb. 22, 2011

(54) ADAPTIVE DATA ALIGNMENT

(75) Inventor: Syed B. Mohiuddin, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 627 days.

(21) Appl. No.: 11/865,285

(22) Filed: Oct. 1, 2007

(65) Prior Publication Data

US 2009/0086870 A1   Apr. 2, 2009

(51) Int. Cl.
*H04B 3/00* (2006.01)

(52) U.S. Cl. .................. 375/257; 375/226; 375/220; 375/280; 375/356

(58) Field of Classification Search .............. 375/226, 375/220, 222, 280, 356
See application file for complete search history.

(56) References Cited

U.S. PATENT DOCUMENTS 6,618,395 B1 * 9/2003 Kimmitt .................. 370/473

2006/0129869 A1 * 6/2006 Hendrickson et al. ....... 713/503
2007/0089009 A1 * 4/2007 Nishizawa .................. 714/738

* cited by examiner

*Primary Examiner*—Shuwang Liu
*Assistant Examiner*—Kabir A Timory
(74) *Attorney, Agent, or Firm*—Christopher P. Maiorana, PC (57) ABSTRACT

An apparatus including a transmit circuit, a receive circuit, and a control circuit. The control circuit may be configured to present a plurality of transmit data lanes in response to (i) a plurality of transmit data sources and (ii) a plurality of first skew control signals. The receive circuit may be configured to generate a plurality of receive data lanes in response to (i) the plurality of transmit data lanes and (ii) a plurality of second skew control signals. The control circuit may be configured to generate the first skew control signals and the second skew control signals in response to an alignment of the plurality of receive data lanes. The control circuit may adjust a timing of the receive data lanes and the transmit data lanes to achieve arrival of the receive data lanes across a transmission medium within a skew parameter.

12 Claims, 9 Drawing Sheets

FIG. 1
(CONVENTIONAL)

FIG. 2
(CONVENTIONAL)

FIG. 3

| | 0 | 0 | 0 | 1 | 0 | 0 | 0 | 0 | |
|---|---|---|---|---|---|---|---|---|---|
| | 0 | 0 | 0 | 1 | 0 | 0 | 0 | 0 | |
| | 0 | 0 | 0 | 1 | 0 | 0 | 0 | 0 | |
| | 0 | 0 | 0 | 1 | 0 | 0 | 0 | 0 | |

⋮ ⋮ ⋮ ⋮ ⋮ ⋮ ⋮ ⋮

| | 0 | 0 | 0 | 1 | 0 | 0 | 0 | 0 | |

ADAPTIVE DATA ALIGNMENT

FIELD OF THE INVENTION

The present invention relates to data transmission generally and, more particularly, to a method and/or apparatus for implementing adaptive data alignment in a data transmission system.

BACKGROUND OF THE INVENTION

With the advancement in serial transmission technologies, interfaces based on serial protocols are becoming more and more popular. The main advantages of a serial interface is the use of fewer signal pins, reduced power, longer transmission distances, and the ability to implement higher data rates. One of the inherent properties of most types of serial communication is the ability to implement features such as scalability. Scalability allows a physical layer device (or PHY) to implement more than one physical link to transmit parts of parallel system data over a transmission medium.

Figure 1:
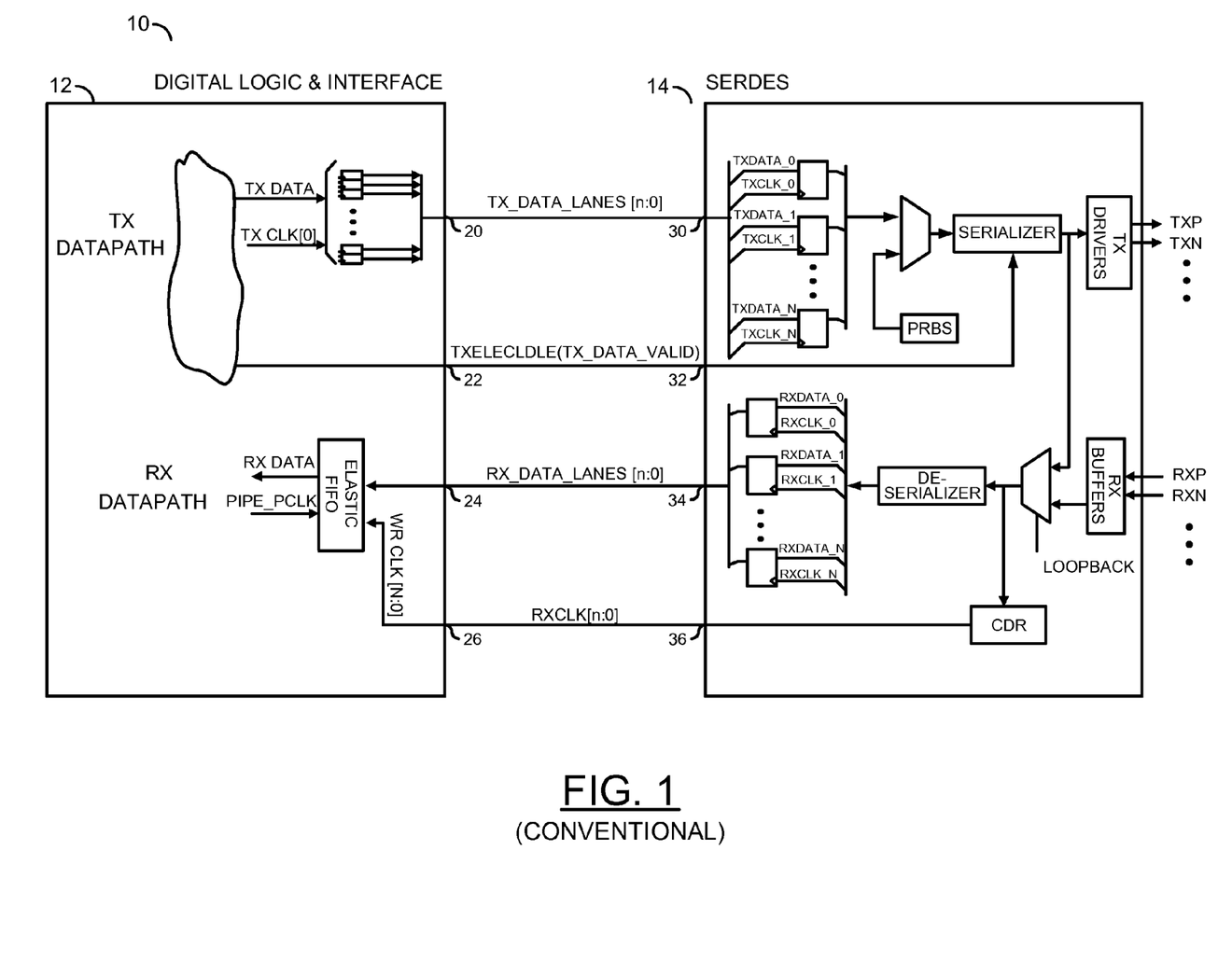
FIG. 1 is a block diagram illustrating a conventional serial interface with multiple lanes.

Referring to FIG. 1, a diagram of a system 10 illustrating a conventional physical layer with multiple links is shown. The system 10 is shown having a block 12 and a block 14. The block 12 implements a digital logic and interface circuit. The block 14 implements a serial/deserial (SerDes) circuit. The circuit 12 has an output 20, an output 22, an input 24 and an input 26. The output 20 transmits a number of transmit data lane signals TX_DATA_LANES[n:0]. The output 22 presents a data valid signal TX_DATA_VALID. The input 24 receives a number of receive data lane signals RX_DATA_LANES[n:0]. The input 26 receives a receive clock signal RXCLK[n:0]. The circuit 14 has an input 30 that receives the signal TX_DATA_LANES[n:0], an input 32 that receives the signal TX_DATA_VALID, an output 34 that presents the signal RX_DATA_LANES[n:0] and an output 36 that presents the signal RXCLK[n:0].

One of the problems faced by the designers of the system 10 is to maintain and minimize the lane-to-lane skew between each of the signals TX_DATA_LANES[n:0]. Skew occurs when one signal arrives at a destination sooner than another signal when the signals were intended to arrive at the same time. Skew issues are becoming more and more challenging for layout and/or backend designers as data bit rates are increasing. As newer fabrication processes are advancing towards the denser technologies (i.e., 65 nm and even 45 nm), skew is becoming more challenging to maintain and minimize. Some designs use more than one SerDes interface to establish a multi-lane serial link. A multi-lane SerDes implementation results in even tighter timing requirements for layout tools. Even if timing tools manage to close the timing on these multi-clock domain paths, such systems are sensitive to voltage and temperature variations and therefore prone to instability. Skew issues are common to all multi-lane and/or multi-link transmission systems using SerDes techniques for serial transmission of data.

Figure 2:
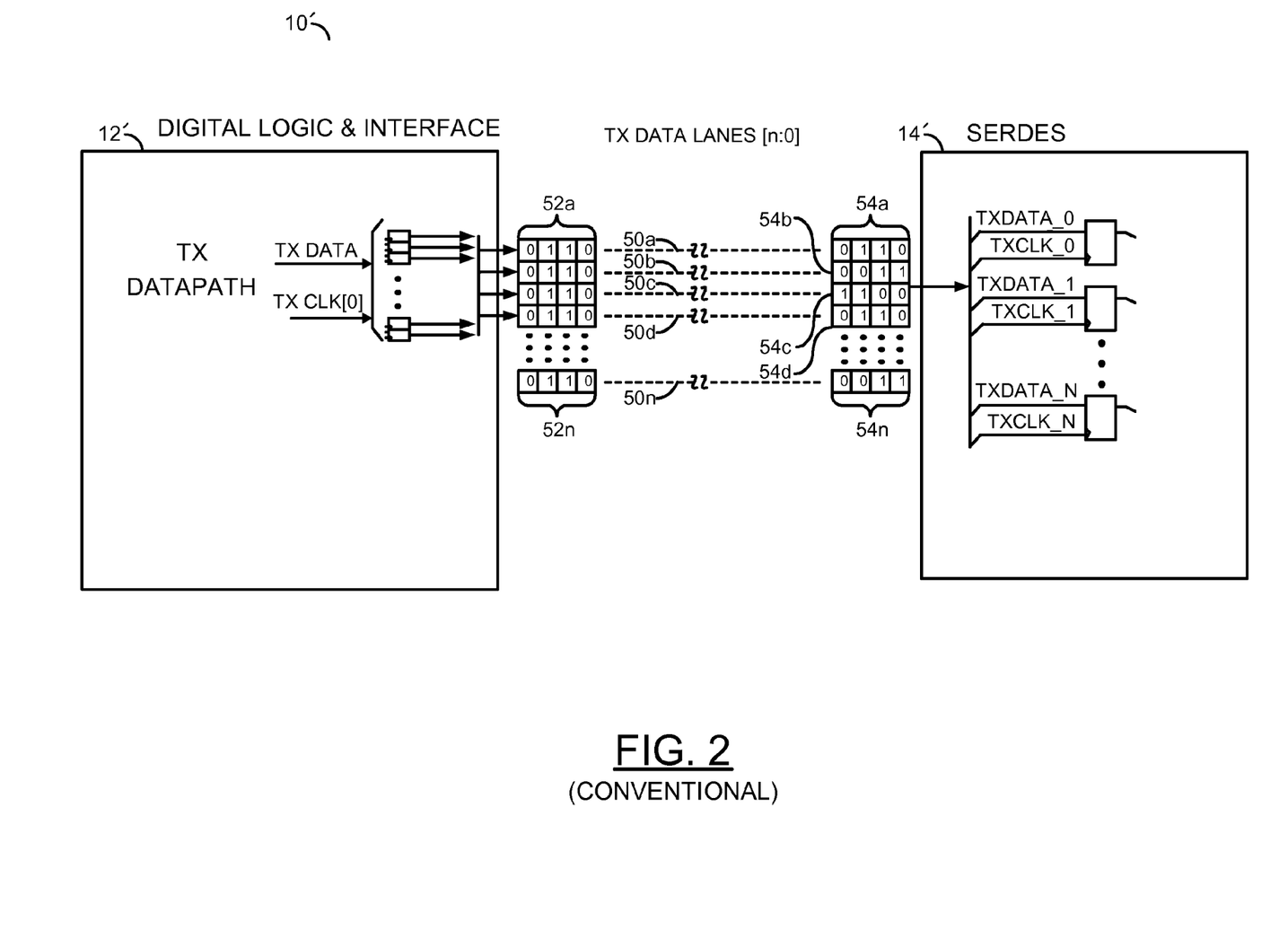
FIG. 2 is a block diagram illustrating the miss-alignment on the transmit data at the receiving side.

Referring to FIG. 2, a diagram of a system 10' is shown. The system 10' illustrates a number of parallel data paths 50a-50n. A number of bits 52a-52n are shown illustrating the skew of each of the data paths 50a-50n as they leave the circuit 12'. A pattern of bits 0110 is shown on each of the data paths 50a-50n, illustrating an alignment configuration without skew. A second pattern of bits is shown as 54a-54n. The bit patterns 54a-54n are shown as entering the circuit 14'. The bit pattern 54b is shown arriving at the circuit 14' one clock cycle ahead of the bits 54a. The bit pattern 54c is shown arriving at the circuit 14' one clock cycle delayed from the bits 54a. The bit pattern 54c is shown delayed by two clock cycles from the bit pattern 54b. The different arrivals of the bit patterns 54a-54n amount to skew. Skew between the paths 50a-50n is more critical on a transmit interface implementing parallel TX data than in a pure serial implementation.

On the receiver side, each receiving data lane TXDATA_0-n is accompanied by a corresponding receive clock TXCLK_0-n. The transmitter lanes TXDATA0-n are usually clocked by a common clock TXCLK[0] but are clocked in at the SerDes by the corresponding TX channel clock. The resulting mis-alignment on the transmit data at the SerDes receiving side can range from a marginal mis-alignment to a more severe mis-alignment depending on the loading on different TX clocks.

It would be desirable to implement a data transmission system that adaptively aligns data path to minimize skew.

SUMMARY OF THE INVENTION

The present invention concerns an apparatus including a transmit circuit, a receive circuit, and a control circuit. The control circuit may be configured to present a plurality of transmit data lanes in response to (i) a plurality of transmit data sources and (ii) a plurality of first skew control signals. The receive circuit may be configured to generate a plurality of receive data lanes in response to (i) the plurality of transmit data lanes and (ii) a plurality of second skew control signals. The control circuit may be configured to generate the first skew control signals and the second skew control signals in response to an alignment of the plurality of receive data lanes. The control circuit may adjust a timing of the receive data lanes and the transmit data lanes to achieve arrival of the receive data lanes across a transmission medium within a skew parameter.

The objects, features and advantages of the present invention include providing a data transmission system that may (i) provide adaptive data alignment, (ii) dynamically adjust the skew between data lanes, (iii) delay faster lanes to be realigned with slower lanes, (iv) provide extra margin for setup and hold timing, and/or (v) provide a more robust system to face temperature and voltage variations.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may be implemented to minimize overall skew issues in a data transmission system by dynamically adjusting the individual skew between various data lanes by delaying the faster lanes to be re-aligned with the slower lanes. The skew adjustment of the present invention may compensate for a variety of causes of the slower lanes. A feedback of the received signals may be implemented such that the adjustment may be provided without regard to the cause of the skew. The present invention may provide extra margin for setup and hold timing so that an overall system becomes more robust to face temperature and voltage variations.

Figure 3:
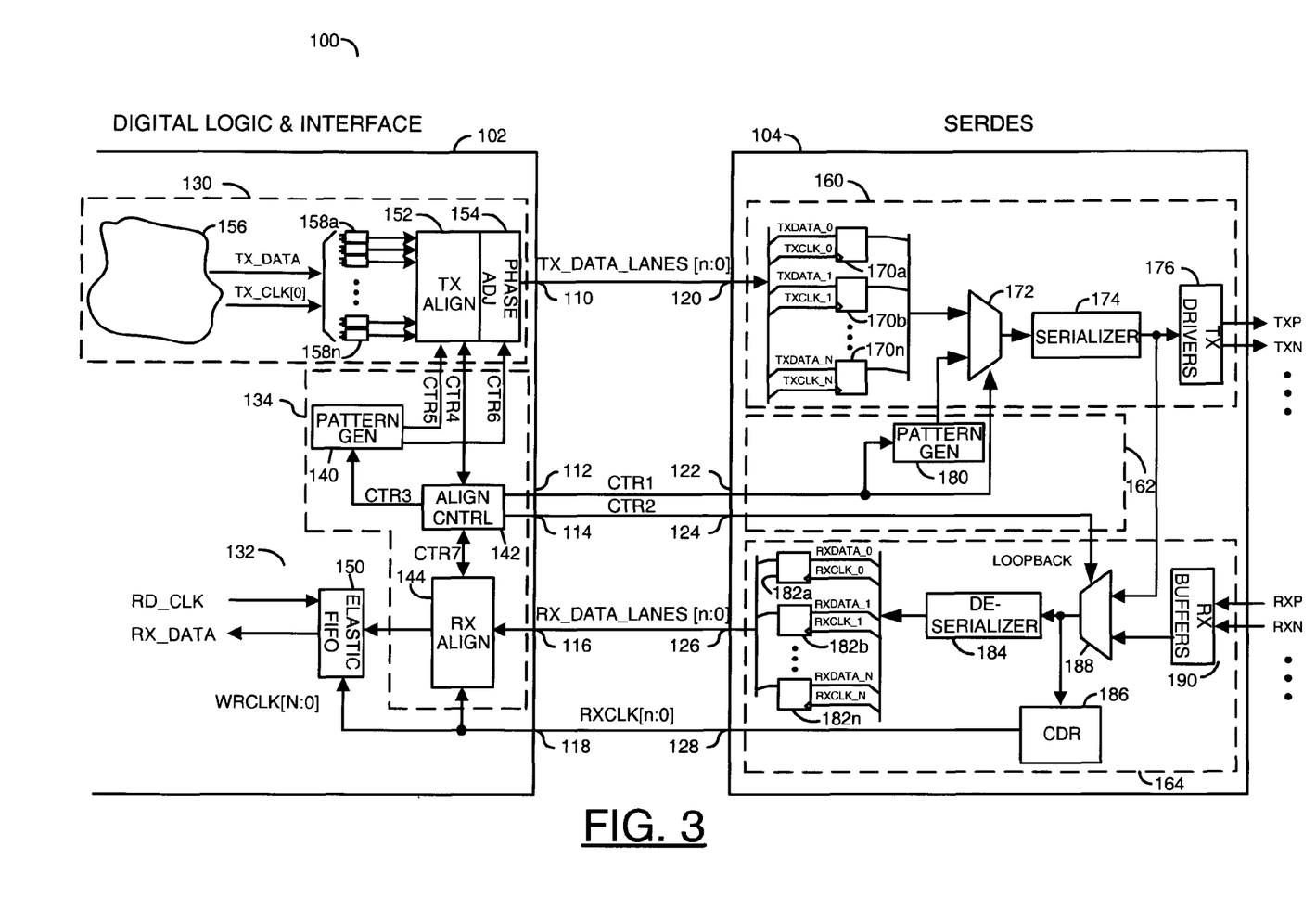
FIG. 3 is a block diagram illustrating a basic embodiment of the present invention.

Referring to FIG. 3, a block diagram of a system 100 is shown in accordance with a preferred embodiment of the present invention. The system 100 generally comprises a block (or circuit) 102 and a block (or circuit) 104. The circuit 102 may be implemented as a digital logic and interface circuit. The circuit 104 may be implemented as a serial/deserial (e.g., SerDes) circuit.

The circuit 102 generally comprises an output 110, an output 112, an output 114, and input 116, and an input 118. The circuit 104 generally comprises an input 120, an input 122, an input 124, an output 126, and an output 128. The output 110 may present a number of signals (e.g., TX_DATA_LANES[n:0]) to an input 120. The output 112 may present a signal (e.g., CTR1) to the input 122. The signal CTR1 may be implemented as a pattern generation control signal. The output 114 may present a signal (e.g., CTR2) to the input 124. The signal CTR2 may be implemented as a loopback control signal. The output 126 may present a number of signals (e.g., RX_DATA_LANES[n:0]) to the input 116. The output 128 may present a signal (e.g., RX_CLK[n:0]) to the input 118.

The circuit 102 generally comprise a transmit block (or circuit) 130, a receive block (or circuit) 132 and a control block (or circuit) 134. The control portion 134 generally comprises a block (or circuit) 140, a block (or circuit) 142 and a block (or circuit) 144. The circuit 140 may be implemented as a pattern generation circuit. The circuit 142 may be implemented as an alignment control circuit. The circuit 144 may be implemented as a receive alignment circuit.

The circuit 144 generally receives the signals RX_DATA_LANES[n:0]. The circuit 144 normally passes the signals RX_DATA_LANES[n:0] through to a circuit 150. The circuit 150 may be implemented as a buffer circuit. For example, the circuit 150 may be implemented as an elastic buffer (e.g., Elastic Fifo). In one example, the circuit 150 may be implemented as a First-In, First-Out buffer. The circuit 144 is normally inserted in the path of the signals RX_DATA_LANES[n:0]. The circuit 144 may also present a control signal (e.g., CTR7) to the circuit 142. The circuit 142 may generate the control signal CTR1, the control signal CTR2, a control signal CTR3, and a control signal CTR4, in response to the signal CTR7. The circuit 140 may generate a control signal CTR5 and a control signal CTR6 in response to the control signal CTR3. The control signals CTR4, CTR5 and CTR6 may be presented to the transmit circuit 130. The transmit circuit 130 normally adjusts the transmission of each of the signals TX_DATA_LANES[n:0] in response to the control signal CTR4, CTR5 and CTR6.

The circuit 130 generally comprises a block (or circuit) 152, a block (or circuit) 154, a medium 156, and a number of blocks (or circuit) 158a-158n. The circuit 152 may be implemented as a transmit align circuit. The circuit 154 may be implemented as a phase adjustment circuit.

The system 100 may provide multi-lane skew re-alignment based on (i) Data Skew adjustment and/or (ii) phase adjustment. The data skew adjustment process normally involves (i) receive (RX) data alignment and/or (ii) transmit (TX) data alignment. The portion of the circuit 102 and the circuit 104 that generates and receives the signals TX_DATA_LANES[n:0] may be referred to as the transmit data and/or the transmit data path. The portion of the circuit 102 and the circuit 104 that generates and receives the signals RX_DATA_LANES[n:0] and the signal RX_CLK[n:0] may be referred to as the receive data and/or the receive data path.

The circuit 104 generally comprises a block (or circuit) 160, a block (or circuit) 162 and a block (or circuit) 164. The circuit 160 may be implemented as a serializer circuit. The circuit 164 may be implemented as a de-serializer circuit. The circuit 162 may be implemented as a control circuit. The circuit 160 generally comprises a number of receive sections 170a-170n. The receive sections may be implemented as shift registers. The circuit 160 may also include a block (or circuit) 172, a block (or circuit) 174 and a block (or circuit) 176. The circuit 172 may be implemented as a multiplexer circuit. The circuit 174 may be implemented as a serializer circuit. The circuit 176 may be implemented as a transmit driver circuit. The multiplexer 172 may receive the first input from the sections 170a-170n. The multiplexer 172 may receive a second input and a select signal from the control circuit 162.

The control circuit 162 may include a pattern generator 180. The pattern generator may generate the second input to the multiplexer 172 in response to the control signal CTR1. The pattern generator 180 is normally initialized to start sending a data pattern on the RX_DATA_LANES[n:0]. A signal MUX_CONTROL may control the multiplexer 172 and may be initially set to "001" (e.g., selecting RD*2 data as RD_OUT* in FIG. 5).

The circuit 164 generally comprises a number of receive circuits 182a-182n, a block (or circuit) 184, a block (or circuit) 186, a block (or circuit) 188, and a block (or circuit) 190. The circuit 190 may be implemented as a receive buffer circuit. The circuit 188 may be implemented as a multiplexer circuit. The circuit 186 may be implemented as a clock data recovery (CDR) circuit. The circuit 186 may be used to recover clock and data information from an input Serial data stream. The circuit 186 may also synchronize an internal serial clock with the recovered clock. The circuit 184 may be implemented as de-serializer circuit. The circuits 182a-182n may be implemented as shift registers.

The receive data alignment process and transmit data alignment process are normally implemented as separate processes. The receive data alignment is normally performed on the data path starting from the circuit 104 when generating the signals RX_DATA_LANES[n:0]. In certain implementations, the signals RX_DATA_LANES[n:0] are comparably less critical in terms of timing adjustments than the signals TX_DATA_LANES[n:0], since the receive data is normally accompanied by a corresponding receive clock. The circuit 104 is normally responsible for generating the data signals RX_DATA_LANES[n:0] as well as an associated clock signal (e.g., RXCLK[n:0]). The timing path may not be as critical since data and clock paths are provided synchronously and may be aligned during the layout process to close the timing requirement. The transmit data path is normally a critical path since all of the transmit data is usually synchronous to a common clock (e.g., TX_CLK[0]). The common clock signal TX_CLK[0] is normally used by other core logic as well. The clock signal TX_CLK[0] is normally loaded, resulting in a relatively large skew between the clock signal TX_CLK[0]

and the clock signals TXCLK_1-TXCLK_n generated by the circuit 104 being used to latch in the transmit data signals TXDATA_0-TXDATA_n.

Figure 5:
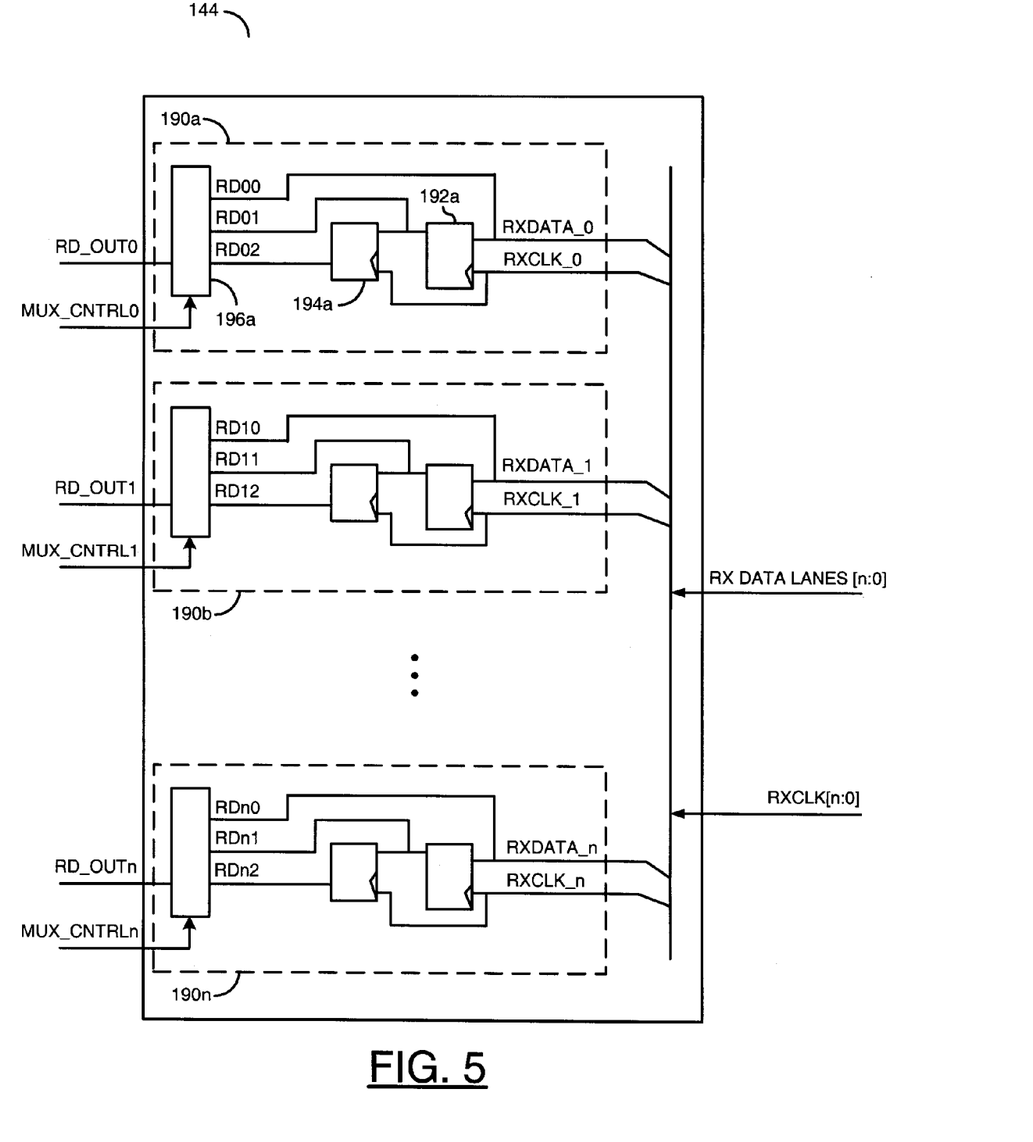
FIG. 5 is a diagram illustrating an example implementation of the receive alignment block.

The receive data alignment process (to be described in more detail in connection with FIG. 5) may be used to ensure that the receive path is aligned with the skew being minimized between the signals RX_DATA_LANES [n:0]. The receive alignment circuit 144 normally provides status to the alignment control block 142 through the control signal CT7. The status may include information concerning the alignment of the signals RX_DATA_LANES[n:0] after the receive data alignment process is complete. The receive alignment circuit 144 normally shifts the skew of the signals RX_DATA_LANES[n:0] in response to a command from alignment control block 142 presented through the signal CTR7. The receive alignment circuit 144 stores and provides one or more results of data pattern analysis, selecting received (e.g., "RD") data and generating a number of status signals (e.g., ANY_1, ANY_2, ANY3, etc.). The receive data RD may be represented as RD00, RD01, RD02 (in block 190a of FIG. 5), RD10, RD11, RD12 (in block 190b of FIG. 5) and RDn0, RDn1, RDn2 (in block 190n of FIG. 5). The following operations outline the generation of the status signals:

| | |
|---|---|
| ANY_1 | Logic OR of all "RD*2" data |
| ALL_0 | Logic OR of all "RD_OUT*" data |
| ALL_1 | Logic AND of all "RD_OUT*" data |

Figure 4:
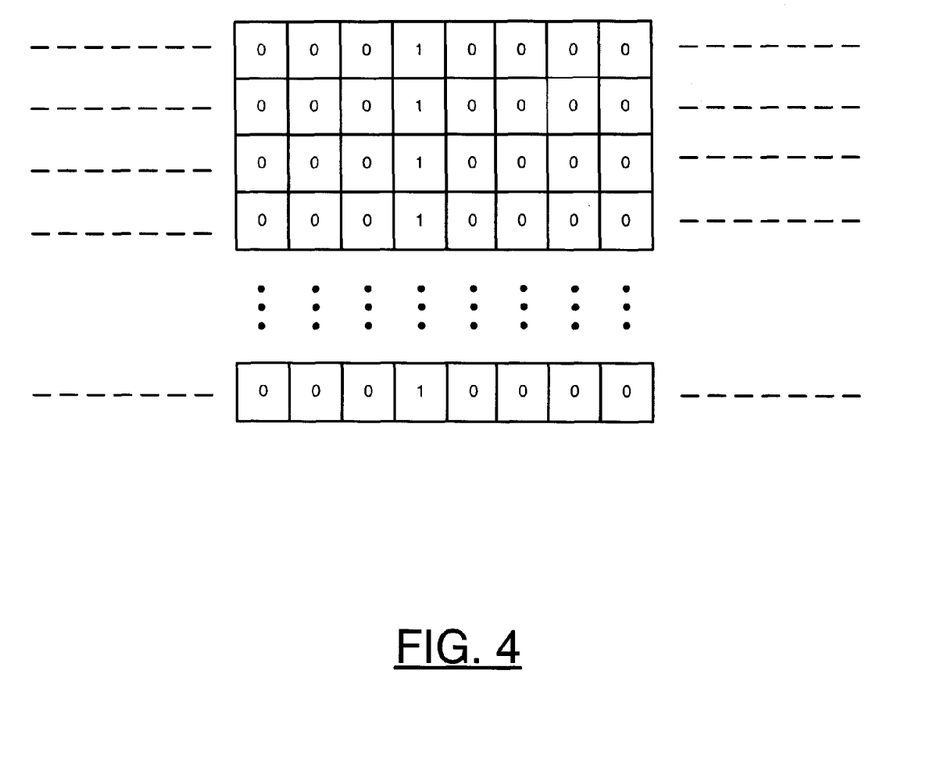
FIG. 4 is a diagram illustrating a receive pattern.

Referring to FIG. 4, a diagram illustrating a receive pattern is shown. The receive pattern is normally the pattern of bits presented on the signal TRANSMIT_DATA_LANES[n:0] received inside the circuit 104 after the alignment process has been completed. Once proper skew has been achieved, the pattern shown should be received having an alignment within skew tolerances.

Referring to FIG. 5, a diagram illustrating a more detailed diagram of the receive alignment circuit 144 is shown. The circuit 144 generally comprises a number of paths 190a-190n. The path 190a generally receives a signal RXDATA_0 (e.g., the first bit of the signal RX_DATA_LANES[n:0]), and a clock signal RXCLK_0 (e.g., the first bit of the signal RXCLK[n:0]). The path 190a generally comprises a circuit 192a, a circuit 194a and a circuit 196a. The circuit 192a may be implemented as a shift register. The circuit 194a may be implemented as a shift register. The circuit 196a may be implemented as a multiplexer. The multiplexer 196a may select between a signal RD00, a signal RD01 and a signal RD02 in response to the signal MUX_CTRL0. The shift register 194a may generate the signal RD02. The shift register 192a may generate the signal RD01. The signal RXDATA_0 may be presented to the multiplexer 196a as the signal RD00. The paths 190b-190n may be implemented having similar components. While an example of the components 192a, 194a and 196a have been shown, other modifications and/or variations may be made to meet the design criteria of a particular implementation.

Figure 6:
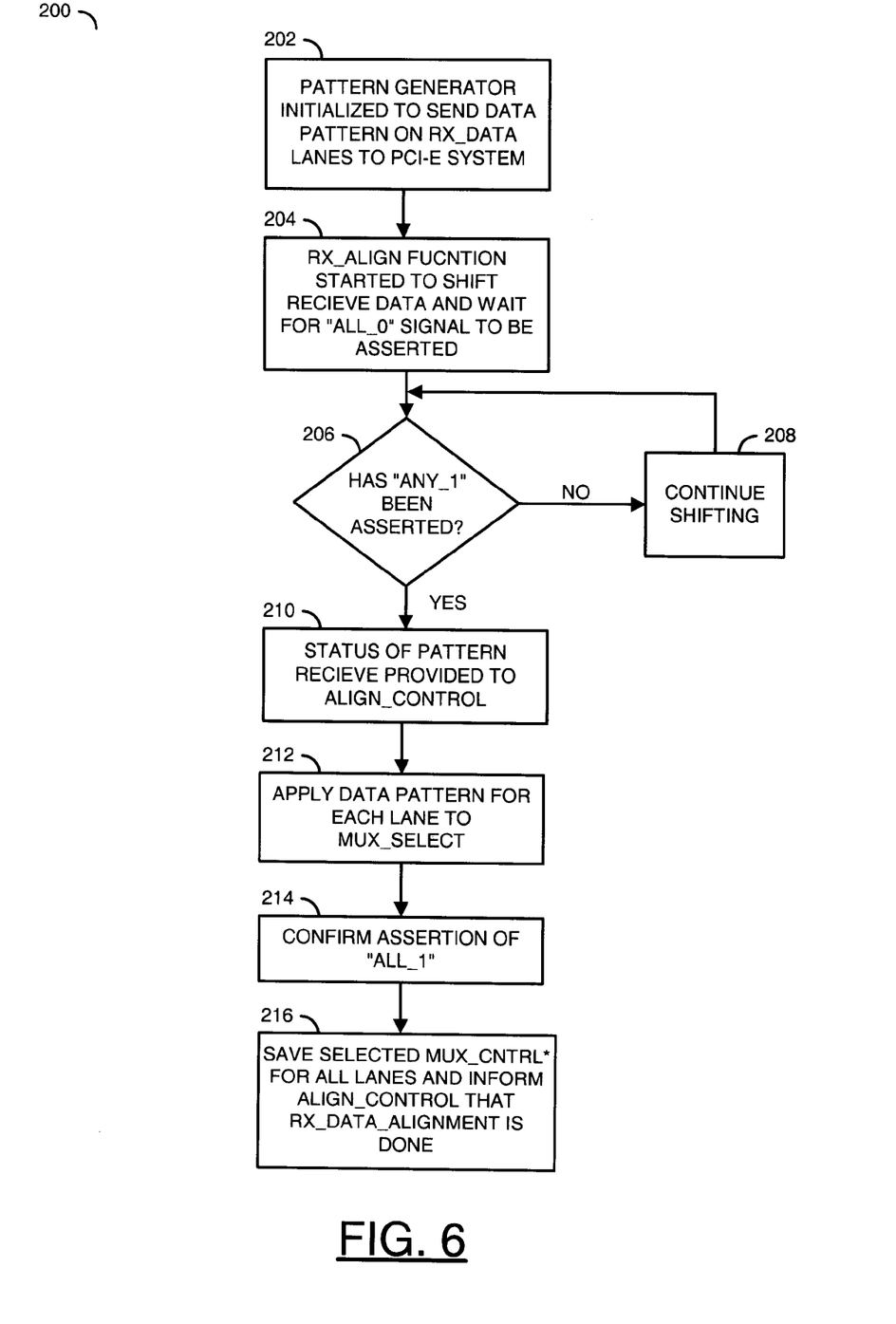
FIG. 6 is a flow diagram illustrating a behavioral model of receive align functions.

Referring to FIG. 6, a flow diagram of a process 200 illustrating the behavioral model of receive align functions is shown. The process 200 normally comprise a state 202, a state 204, a decision state 206, a state 208, a state 210, a state 212, a state 214, and a state 216. The state 202 may initialize the pattern generator to send data pattern on the RX_DATA lines. The system 200 may then move to the state 204 where the RX_ALIGN function starts to shifting receive data and waits for the signal ALL_0 to be asserted. The system 200 may then move to the decision state 206. The decision state 206 may decide if the signal ANY_1 has been asserted. The state 208 continues shifting until the signal ANY_1 is asserted. Once the signal ANY_1 is asserted, the method 200 stop shifting the receive data. The state 210 normally provide the status of pattern receive to the signal ALIGN_CONTROL. The state 212 applies the data pattern for each lane to the signal MUX_CNTRL[0:n] for selecting the one RD** data that contains a "1", as shown in TABLE 2 below. The state 214 normally confirms assertion of the signal ALL_1 as shown in TABLE 2. The state 216 normally saves the selected patterns for the signal MUX_CNTRL for all the lanes, as shown in TABLE 2. The state 216 may also inform the alignment control circuit 142 that the receive data alignment is complete.

Figure 7:
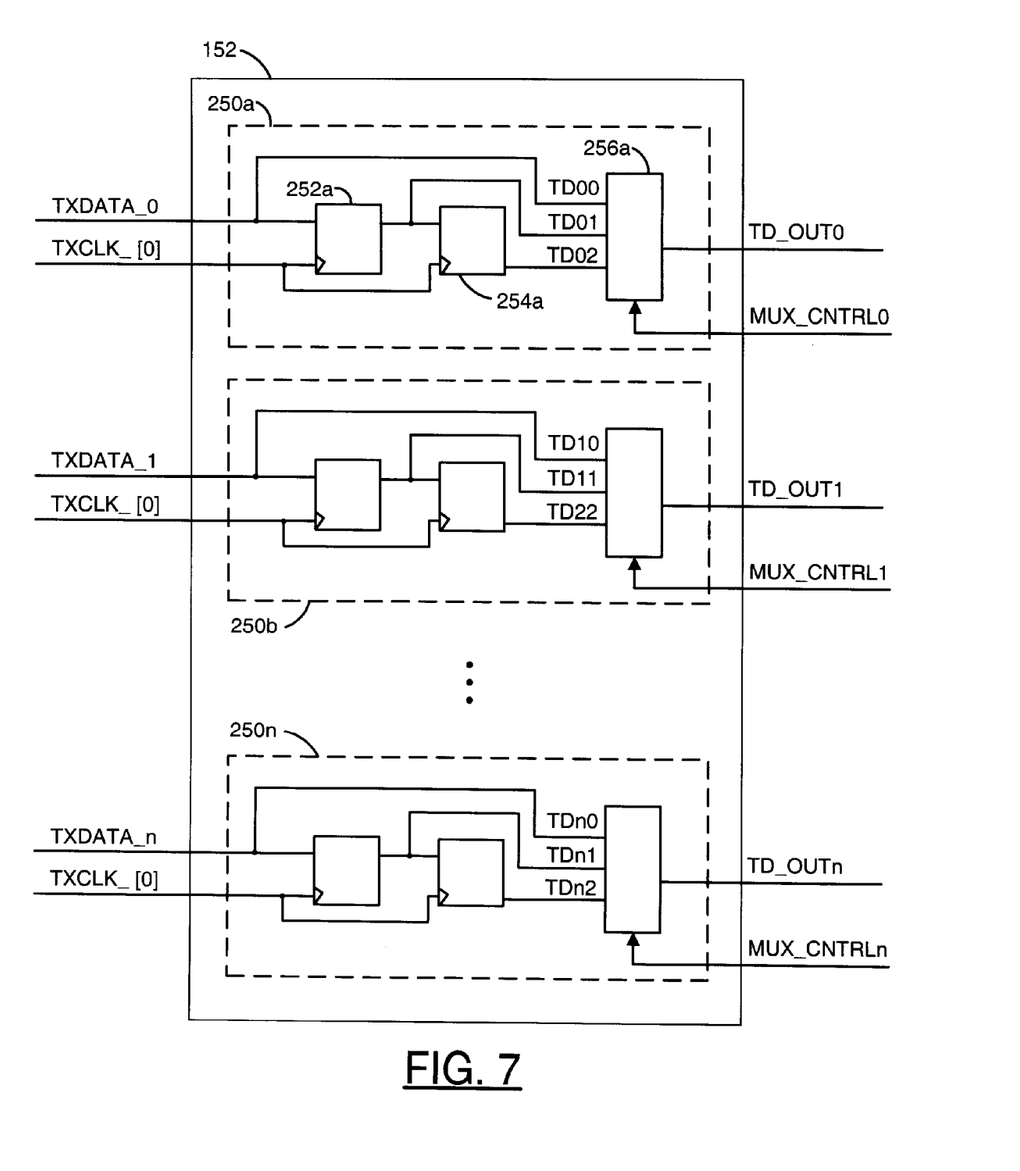
FIG. 7 is a diagram illustrating an example implementation of the transmit alignment block.

Referring to FIG. 7, a more detailed diagram of the transmit alignment circuit 152 is shown. The circuit 152 generally comprises a number of paths 250a-250n. The path 250a generally receives a signal TXDATA_0 (e.g., the first bit of the signal TX_DATA_LANES[n:0]). The path 250a also receives a clock signal TXCLK[0]. The path 250a generally comprises a circuit 252a, a circuit 254a and a circuit 256n. The circuit 252a may be implemented as a shift register. The circuit 184a may be implemented as a shift register. The circuit 186a may be implemented as a multiplexer. The path 250a normally presents a signal TD_OUT0 (the first bit of the signal TX_DATA_LANES [n:0]) and a signal MUX_CNTRL0, which are used by the circuit 144. The multiplexer 156n may select between a signal TD00, a signal TD01, and a signal TD02. The shift register 254b normally presents the signal TD02. The shift register 252a normally presents the signal TD01. The signal TXDATA_0 is normally presented as a signal TD00. The multiplexer 256a selects between the signal TD00, the signal TD01, and the signal TD02 in response to the signal MUX_CNTRL0. The pads 256b-256n may be implemented having similar components. While an example of the components 252a, 254a, and 256a have been shown, other modifications and/or variations may be made to meet the design criteria of a particular implementation.

The following TABLE 1 illustrates the signal RD_MUX_CNTRL, the signal RD_DATA and control signals before the receive alignment process:

TABLE 1

| Lane # | MUX_PATTERN | RD_OUT* | RD*2 | RD*1 | RD*0 | ANY_1 | ALL_1 | ALL_0 |
|---|---|---|---|---|---|---|---|---|
| 0 | MUX_CNTRL0 | 0 | 0 | 1 | 0 | | | |
| 1 | MUX_CNTRL1 | 0 | 1 | 0 | 0 | | | |
| 2 | MUX_CNTRL2 | 0 | 0 | 1 | 0 | | | |
| 3 | MUX_CNTRL3 | 1 | 0 | 0 | 1 | | | |
| . | . | | | | | | | |
| . | . | | | | | | | |
| . | . | | | | | | | |
| n | MUX_CNTRLn | 0 | 1 | 0 | 0 | 1 | 0 | 0 |

The following TABLE 2 illustrates the signal RD_MUX_CNTRL, the signal RD_DATA and control signals after the receive alignment process:

TABLE 2

| Lane # | MUX_PATTERN | RD_OUT* | RD*2 | RD*1 | RD*0 | ANY_1 | ALL_1 | ALL_0 |
|---|---|---|---|---|---|---|---|---|
| 0 | MUX_CNTRL0 | 1 | 0 | 1 | 0 | | | |
| 1 | MUX_CNTRL1 | 1 | 1 | 0 | 0 | | | |
| 2 | MUX_CNTRL2 | 1 | 0 | 1 | 0 | | | |
| 3 | MUX_CNTRL3 | 1 | 0 | 0 | 1 | | | |
| . | . | | | | | | | |
| . | . | | | | | | | |
| . | . | | | | | | | |
| n | MUX_CNTRLn | 1 | 1 | 0 | 0 | 1 | 1 | 0 |

The transmit data process involves the transmit data path. The receive path (e.g., from the circuit 104) is normally already aligned by the receive alignment process as described above.

Figure 8:
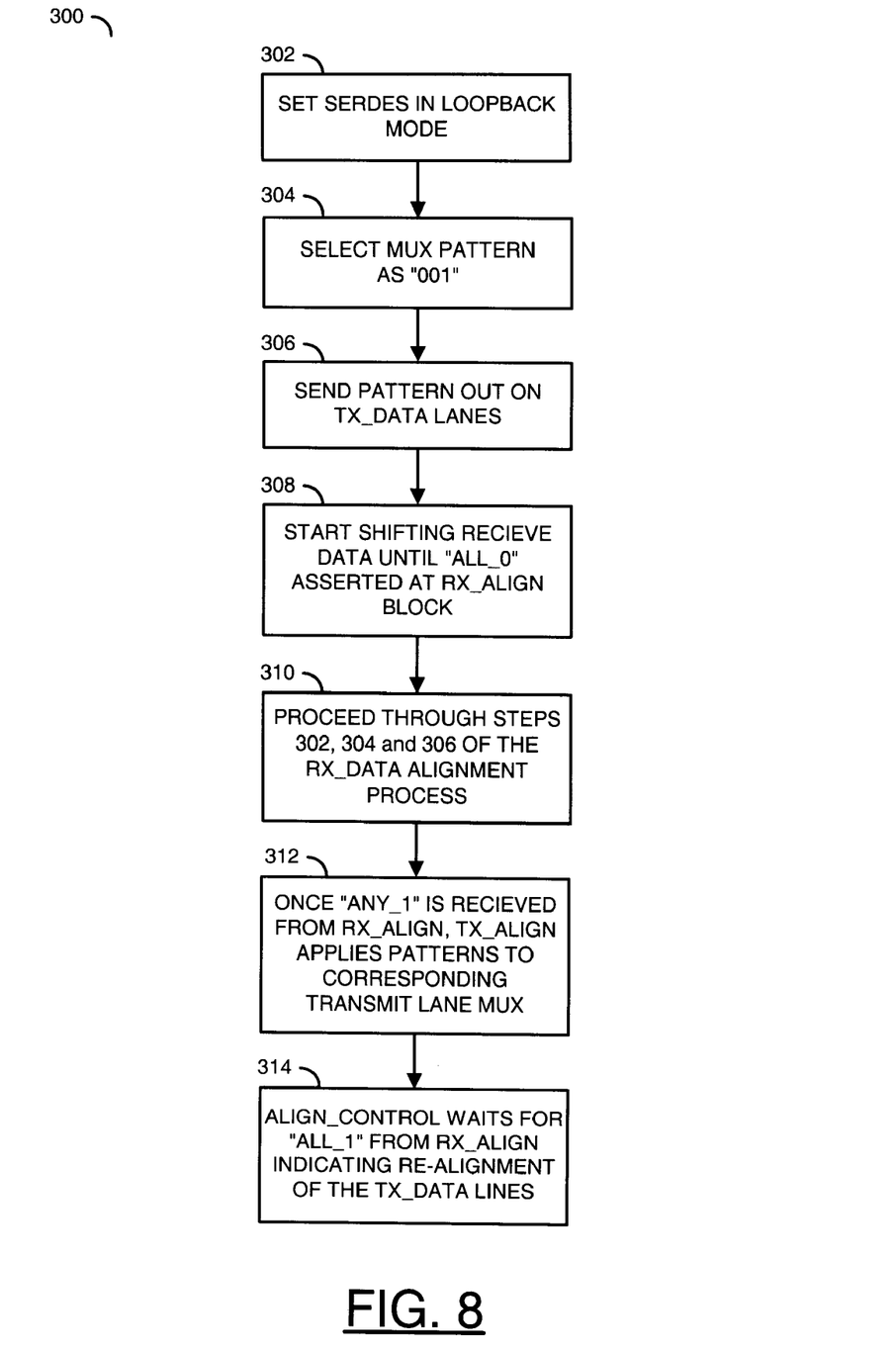
FIG. 8 is a flow diagram illustrating a behavioral model of transmit align functions.

Referring to FIG. 8, a flow diagram of the behavioral model of the transmit alignment process is shown. The method 300 generally comprises a state 302, a state 304, a state 306, a state 308, a state 310, a state 312 and a state 314. The state 302 normally sets the circuit 104 in loopback mode. The state 304 normally selects a pattern for the signal MUX_CNTRL[0:n] as "001" (e.g., selecting TD*0 data). The state 306 normally starts sending a pattern out on the signal TX_DATA_LANES [n:0]. The pattern may be similar to the data pattern (shown in FIG. 4) used by the circuit 104 during the receive data alignment process. The data pattern will enter the paths 170a-170n and will normally loopback through the paths 182a-182n. The state 308 normally starts shifting the receive data until the signal ALL_0 is asserted. The asserted status will be provided to transmit alignment circuit 152. The status 310 continues go through steps 302, 304 and 306 as described in the receive data alignment process. In the state 312, once the signal ANY_1 is received from the receive alignment circuit 144, the transmit alignment circuit 152 will apply the patterns to the corresponding transmit lane multiplexer and will normally start steps 306, 308 and 310. In the state 314, the alignment control circuit 142 waits for the signal ALL_1 from the receive alignment circuit 144 to indicate re-alignment of the TX_DATA_LANES[n:0].

At this time both the signal RX_DATA_LANES[n:0] and the signal TX_DATA_LANES [n:0] are re-aligned. Lane skews should be re-adjusted so that if the transmit alignment process is repeated, the signal ALL_1 should be asserted along with the signal ANY_1.

Figure 9:
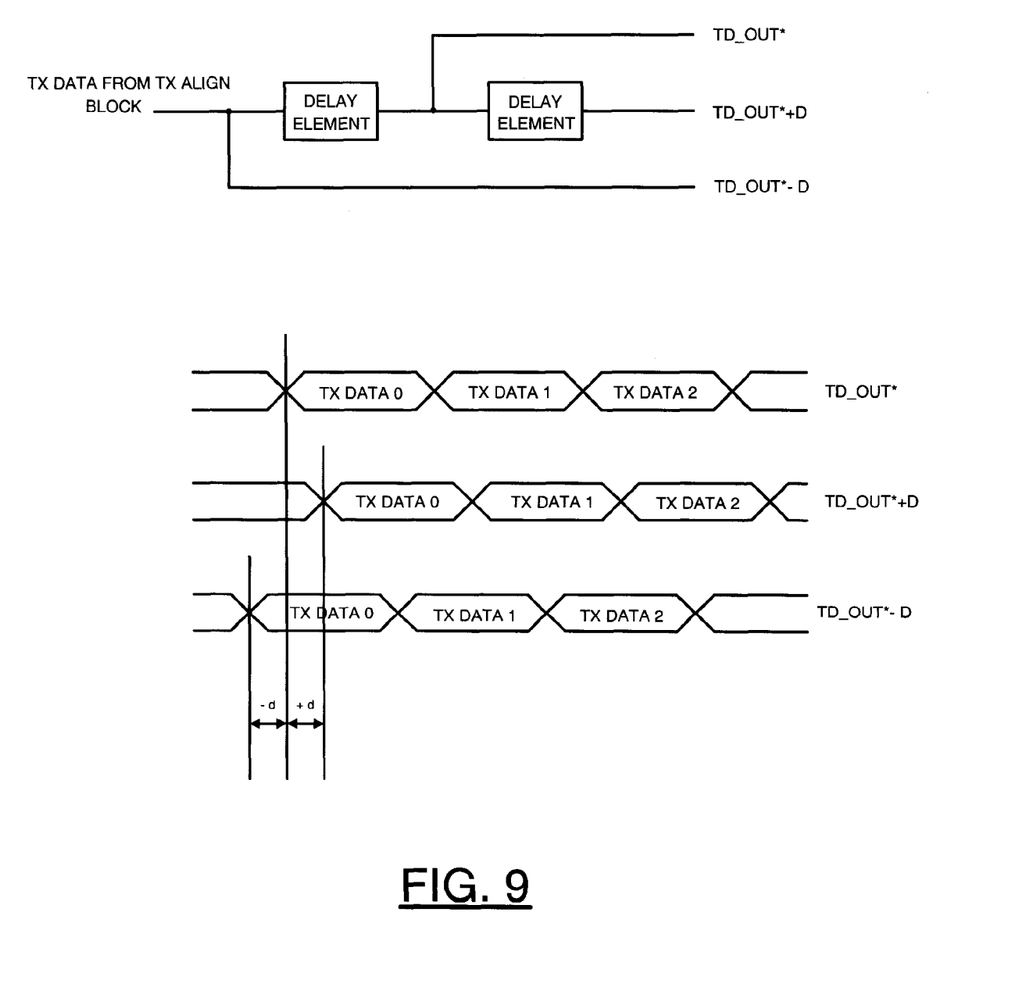
FIG. 9 is a block diagram illustrating a multi-phased td-out(s) generation and related timing.

This process is done after completing RX and TX Data alignment and provides further fine tuning and adds extra setup or hold timing margin to each of the transmit data lanes. To accomplish this, two variants of a transmit data signal TD_OUT are generated. The generation and related timings of the variants of the signal TD_OUT (e.g., TD_OUT, TDOUT+D and TD_OUT−D) are shown in FIG. 9.

The process of transmit phase alignment is similar to transmit data alignment. Instead of sending data pattern once, three variances of TD_OUT (e.g., TD_OUT, TD_OUT+D and TD_OUT−D) are used in three passes. The resulting data patterns on the signal MUX_CNTRL* for all three passes are saved as the signal MUX_PATTERN1, the signal MUX_PATTERN2 and the signal MUX_PATTERN3 for each lane. These signals MUX_PATTERN1-3 are than analyzed to select the best TD_OUT for each TX data lane based on the following rules 1. If MUX_PATTERN1==MUX_PATTERN2==MUX_PATTERN3=>Select MUX_PATTERN2 (e.g., TD_OUT for TX Data out)
2. If MUX_PATTERN1==MUX_PATTERN2 != MUX_PATTERN3=>Select MUX_PATTERN1 (e.g., TD_OUT−D for TX Data out)
3. If MUX_PATTERN2==MUX_PATTERN3 != MUX_PATTERN1=>Select MUX_PATTERN3 (e.g., TD_OUT+D for TX Data out)

The present invention provides an effective process for dealing with the ever growing timing problem being faced by IC design engineers. Timing issues are expected to become more critical since the technology is moving towards 65 nm and 45 nm, while data rates are also expected to increase.

The present invention provides a lane de-skew process to the TX data path from the digital logic 102 to the SerDes parallel interface 104. The receive data path from SerDes circuit 104 to digital logic 102 is also aligned and de-skewed if needed.

During transmit data alignment process, the SerDes circuit 104 is normally programmed in the Loopback mode. The SerDes circuit 104 normally uses the bit clock (e.g., the TX Data) to generate the recovered (e.g., received) clock. Because of this inherent relation between the TX data clock and the recovered clock in this Loopback mode, there is not normally a need to synchronize the received data inside the receive interface.

The examples described illustrated an adjustment of up to three clock cycles. Such an adjustment may be an example of a typical worst case scenario in a real system. Additional adjustments may be needed, since data bit rates are moving towards higher side. A similar approach may be used to de-skew alignment for data lanes for up to two (or more) clock cycles.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a transmit circuit configured to present a plurality of transmit data lanes in response to (i) a plurality of transmit data sources and (ii) a plurality of first skew control signals, wherein (a) a delay is added to one or more of said plurality of transmit data lanes in response to said plurality of first skew control signals and (b) said transmit circuit comprises a transmit alignment circuit coupled to a phase adjustment circuit configured to provide said delay in response to said plurality of first skew control signals;

a receive circuit configured to generate a plurality of receive data lanes in response to (i) said plurality of transmit data lanes and (ii) a plurality of second skew control signals; and a control circuit configured to generate said plurality of first skew control signals and said plurality of second skew control signals in response to a feedback of an arrival of said plurality of transmit data lanes, wherein said control circuit (i) adjusts a timing of said receive data lanes and said transmit data lanes to achieve an alignment of said receive data lanes across a transmission medium within a skew parameter and (ii) further comprises a pattern generation circuit configured to generate a second one or more of said first skew control signals.

2. The apparatus according to claim 1, wherein said control circuit further comprises a receive alignment circuit configured to generate one or more of said plurality of first skew control signals in response to said receive data lanes.

3. The apparatus according to claim 1, wherein said transmit circuit further comprises the phase adjustment circuit configured to provide a phase adjustment to said plurality of transmit data signals.

4. The apparatus according to claim 1, wherein said receive circuit further comprises a pattern generation circuit configured to receive one of said plurality of second skew control signals.

5. The apparatus according to claim 1, wherein said receive circuit further comprises (i) a transmit driver section configured to present serial data and (ii) a receive buffer section configured to receive serial data.

6. An apparatus comprising:

means for presenting a plurality of transmit data lanes in response to (i) a plurality of transmit data sources and (ii) a plurality of first skew control signals, wherein (a) a delay is added to one or more of said plurality of transmit data lanes in response to said plurality of first skew control signals and (b) a transmit alignment circuit coupled to a phase adjustment circuit configured to provide said delay in response to said plurality of first skew control signals;

means for generating a plurality of receive data lanes in response to (i) said plurality of transmit data lanes and (ii) a plurality of second skew control signals; and means for generating said plurality of first skew control signals and said plurality of second skew control signals in response to a feedback of an arrival of said plurality of transmit data lanes, wherein (a) a control circuit adjusts a timing of said receive data lanes and said transmit data lanes to achieve an alignment of said receive data lanes across a transmission medium within a skew parameter and (b) a transmit alignment circuit is configured to provide said timing adjustment in response to said plurality of first skew control signals.

7. A method for adjusting timing of a plurality of receive data lanes and transmit data lanes, comprising the steps of:

(A) presenting a plurality of transmit data lanes in response to (i) a plurality of transmit data sources and (ii) a plurality of first skew control signals, wherein (a) a delay is added to one or more of said plurality of transmit data lanes in response to said plurality of first skew control signals and (b) said timing adjustment is generated using a transmit alignment circuit coupled to a phase adjustment circuit;

(B) generating a plurality of receive data lanes in response to (i) said plurality of transmit data lanes and (ii) a plurality of second skew control signals; and (C) generating said plurality of first skew control signals and said plurality of second skew control signals in response to a feedback of an arrival of said plurality of transmit data lanes, wherein a control circuit (i) adjusts a timing of said receive data lanes and said transmit data lanes to achieve an alignment of said receive data lanes across a transmission medium within a skew parameter and (ii) a transmit alignment circuit is configured to provide said timing adjustment in response to said plurality of first skew control signals.

8. The method according to claim 7, wherein step (C) further comprises generating one or more of said plurality of first skew control signals in response to said receive data lanes.

9. The method according to claim 7, wherein step (A) provides a phase adjustment to said plurality of transmit data signals using the phase adjustment circuit.

10. The method according to claim 7, wherein step (B) receives one of said plurality of second skew control signals from a pattern generation circuit.

11. The method according to claim 7, wherein said method further includes presenting serial data through a transmit driver section.

12. The method according to claim 7, wherein said method further comprises recovering serial data through a receive buffer section.

\* \* \* \* \*